United States Patent
Akbaraly

(10) Patent No.: US 12,137,709 B2
(45) Date of Patent: Nov. 12, 2024

(54) METHOD FOR PRODUCING A FERMENTED FOOD PRODUCT BASED ON A PROTEIN- AND OIL-YIELDING PLANT

(71) Applicant: LES NOUVEAUX AFFINEURS, Massy (FR)

(72) Inventor: Nour Akbaraly, Vanves (FR)

(73) Assignee: LES NOUVEAUX AFFINEURS, Massy (FR)

( * ) Notice: Subject to any disclaimer, the term of this patent is extended or adjusted under 35 U.S.C. 154(b) by 149 days.

(21) Appl. No.: 17/415,166

(22) PCT Filed: Dec. 23, 2019

(86) PCT No.: PCT/FR2019/000217
§ 371 (c)(1),
(2) Date: Jun. 17, 2021

(87) PCT Pub. No.: WO2020/128172
PCT Pub. Date: Jun. 25, 2020

(65) Prior Publication Data
US 2022/0053788 A1  Feb. 24, 2022

(30) Foreign Application Priority Data

Dec. 21, 2018 (FR) ....................................... 1873928
Dec. 23, 2019 (FR) ....................................... 1915409

(51) Int. Cl.
| | | |
|---|---|---|
| A23C 20/02 | (2021.01) | |
| A23L 11/40 | (2021.01) | |
| A23L 11/45 | (2021.01) | |

(52) U.S. Cl.
CPC ............... *A23L 11/45* (2021.01); *A23L 11/40* (2021.01); *A23V 2400/123* (2023.08); *A23V 2400/169* (2023.08); *A23V 2400/249* (2023.08)

(58) Field of Classification Search
CPC ...... A23L 11/45; A23L 11/40; A23Y 2220/15; A23Y 2220/67; A23Y 2240/75

USPC ........................................................... 426/46
See application file for complete search history.

(56) References Cited

U.S. PATENT DOCUMENTS

| | | | | |
|---|---|---|---|---|
| 3,944,676 A | * | 3/1976 | Fridman | ................... A23J 1/14 426/582 |
| 5,597,594 A | | 1/1997 | Matsuura | |
| 6,254,900 B1 | | 7/2001 | Hansen | |
| 2015/0305361 A1 | | 10/2015 | Holz-Schietinger et al. | |

FOREIGN PATENT DOCUMENTS

| | | | |
|---|---|---|---|
| CN | 103798397 A | | 5/2014 |
| CN | 106720400 A | | 5/2017 |
| CN | 108208186 A | * | 6/2018 |
| DE | 102007061256 A1 | | 6/2009 |
| EP | 0521331 A2 | | 1/1993 |
| GB | 1356363 A | | 6/1974 |
| JP | 2009171877 A | | 8/2009 |
| RU | 2160543 C1 | | 12/2000 |
| WO | 9842200 A1 | | 10/1998 |
| WO | 2004002231 A1 | | 1/2004 |

OTHER PUBLICATIONS

CN-108208186-A (Year: 2018).*

* cited by examiner

*Primary Examiner* — Brent T O'Hern
(74) *Attorney, Agent, or Firm* — Leason Ellis LLP

(57) ABSTRACT

The present invention relates to a method for manufacturing a proteo-oleaginous-based fermented food product and to the product obtained by means of this method. The product is characterized by an origin that may be 100% plant-based, and in particular free of dairy or animal product and therefore perfectly suitable for individuals on a lactose-free or vegan diet. The method comprises steps of grinding and/or homogenizing, of mixing with ferments, of incubating, and optionally of salting.

15 Claims, No Drawings

METHOD FOR PRODUCING A FERMENTED FOOD PRODUCT BASED ON A PROTEIN- AND OIL-YIELDING PLANT

CROSS-REFERENCE TO RELATED PATENT APPLICATIONS

This application is a U.S. National Stage Application under 35 U.S.C. § 371 of International Patent Application No. PCT/FR2019/000217, filed Dec. 23, 2019, which claims the benefit of priority of French Patent Application numbers FR 1915409 filed Dec. 23, 2019, and FR 1873928 filed Dec. 21, 2018, all of which are incorporated by reference in their entireties. The International Application was published on Jun. 25, 2020, as International Publication No. WO 2020/128172 A1.

The present invention relates to a method for manufacturing a proteo-oleaginous-based fermented food product, and the product obtained by said method. Said product is characterized by an origin which may be 100% plant-based, and in particular without dairy or animal products and thus particularly suitable for persons following a lactose-free or vegetarian diet. The method comprises steps of grinding and/or homogenization, mixing with ferments, incubation, and optionally salting.

In the field of the food industry, the increase, in recent years, of food intolerances, in particular to lactose and to gluten, as well as dietary habits without foods of animal origin, such as diets referred to as vegetarian or "vegan", have caused an explosion in the demand for processed foods which guarantee, to these consumers, an absence of these undesired ingredients, but have good organoleptic qualities which are as close as possible to conventional food products containing these undesired ingredients.

With this in mind, a number of manufacturers have attempted to obtain fermented food products based on ingredients of plant-based origin. Vegetable juice has been used in the food industry for a number of years. Significant progress was made in the 1990s, following the development of a method for fermentation of vegetable milk, described in particular in the patent EP-A-0.521.331. Indeed, said patent relates to a method for fermentation of soya milk, using an inoculum based on at least two specific strains of *Lactococcus* resulting in products having a yogurt-type texture. However, products of this kind cannot be used as a substitute for a dairy product.

Another patent i.e. the patent GB-A-1.356.363, in turn describes a method for manufacturing food products resulting from the lactic fermentation of soya milk in which it is necessary, after fermentation, to implement a step of heating the product obtained. However, said products do not have the desired organoleptic qualities and have an undesired vegetable odor and taste.

An aim of the present invention is therefore that of proposing a method for manufacturing a novel fermented food product of entirely plant-based origin, the organoleptic characteristics of which render the products comparable to traditional fermented dairy products obtained from milk of animal origin.

The applicant has identified a vegetable source that is of interest for the production of a product of this kind, the proteo-oleaginous products, and in particular the association of soya and cashew, and has developed a novel production method which makes it possible to obtain a fermented food product of entirely vegetable origin having the desired organoleptic characteristics.

The Invention:

The present invention thus firstly relates to a method for manufacturing a proteo-oleaginous-based fermented food product, characterized in that it comprises the successive steps of:
  a. preparation of an initial product by grinding and/or homogenization of at least one, preferably at least two, proteo-oleaginous products with water;
  b. addition of at least one ferment to the product obtained in step a., and grinding and/or homogenization;
  c. incubation of the product obtained in step b., at a temperature of between 25 and 60° C., preferably 37 to 50° C., for a period of 3 to 15 hours, preferably 5 to 11 hours.

According to the invention, proteo-oleaginous product means an oleaginous or proteo-oleaginous plant, in particular the seeds or the fruits of said oleaginous or proteo-oleaginous plant. In a general manner, said seeds or fruits are rich in lipids and/or rich in proteins.

Preferably, according to the present invention, said method according to the present invention is characterized in that said at least one proteo-oleaginous product is selected from cashew nut, macadamia nut, Brazil nut, hazelnut, almond, walnut, or another member of the nut family, pea, soya, lupin, chickpea, lentils, or another member of the legume family, flax, and/or sunflower.

The method according to the present invention is characterized in that said at least one, preferably at least two, proteo-oleaginous products are whole, pureed, and/or in milk form.

According to the present invention, soya preferably means dehulled soya in dried form or in the form of soya milk (tonyu) having an amount of dehulled soya which is similar to that in the case where the dehulled soya is used in dried form (i.e. not originating from tonyu). This primary material is prepared by means of traditional techniques that are part of the general knowledge of a person skilled in the art, from dehulled soya beans and water, and then optionally pasteurized and/or sterilized. Soya milk means, in an equivalent manner, soya juice.

According to the present invention, cashew preferably means shelled cashew nuts (which can also be referred to as cashew kernels), either whole or in pieces.

Preferably, according to the present invention, said at least one, preferably at least two, proteo-oleaginous products are a combination of soya, preferably in the form of soya juice, and cashew preferably in the form of shelled cashew nuts, either whole, or in pieces, or cashew juice.

According to an embodiment, said initial product is prepared from 0.25 to 90 wt. % cashew, preferably between 9 and 50 wt. % cashew.

Preferably, according to the present invention, said initial product is prepared from 0.25 to 50 wt. % soya, preferably between 2 and 20 wt. % soya.

Preferably, according to the present invention, said initial product is prepared from 0.25 to 90 wt. % cashew and from 0.25 to 50 wt. % soya.

Preferably, according to the present invention, said initial product is prepared from 2 to 70 wt. % cashew and from 1 to 30 wt. % soya.

Preferably, according to the present invention, said initial product is prepared from 9 to 50 wt. % cashew and from 2 to 20 wt. % soya.

Preferably, according to the present invention, the incubation step (step c.) is carried out in a sterilizer.

Preferably, according to the present invention, said method according to the present invention is characterized in that said steps a. and/or b. comprise grinding of the initial product at a speed of from 1,000 to 40,000 rpm for 30 to 360 seconds.

According to the present invention, grinding means dividing solid elements.

Preferably, according to the present invention, said method comprises a step of molding. The molding is preferably carried out using a measuring tool such as a ladle, a piping bag, or a piston funnel, or a dosing machine, by withdrawing the product obtained in step b. or c. and placing it into a mold, a pot, or a muslin.

Preferably, according to the present invention, said at least one ferment is selected from *Bifidobacterium lactis, Brevibacterium linens, Candida valida, Corynebacterium flavescens, Hafnia alvei, Kluyveromyces lactis, Lactobacillus acidophilus, Lactobacillus bulgaricus, Lactobacillus paracasei, Lactobacillus plantarum, Lactobacillus rhamnosus, Lactococcus cremoris, Lactococcus diacetylactis, Lactococcus lactis, Leuconostoc cremoris, Candida yeast, Staphylococcus carnosus, Staphylococcus Xylosus*, and/or *Streptococcus thermophilus*.

Preferably, according to the present invention, said ferment is added in amounts representing from 0.01 to 2 wt. % with respect to the total amount of initial product obtained in step a., and required for production of the final proteo-oleaginous-based fermented food product.

Preferably, according to the invention, said at least one ferment comprises *Lactobacillus bulgaricus* and *Streptococcus thermophilus*.

According to an embodiment, said at least one ferment comprises *Lactobacillus plantarum*.

According to an embodiment, the method further comprises a step of draining of the product obtained in step c., for from 12 hours to 24 hours, preferably 18 hours, at between 1° C. and 8° C., preferably 4° C.

This draining step brings about a loss of mass of the product of approximately 10 to 30%.

According to an embodiment, the method according to the invention also comprises an additional step of flavoring using spices and/or seasoning and/or condiments, preferably selected from garlic, parsley, chives, pepper, basil, capers, coriander, gherkin, cumin, turmeric, curry, shallot, tarragon, fennel, clove, ginger, olive oil, bay leaves, mustard, hazelnut, walnut, nutmeg, onion, oregano, sorrel, paprika, hot pepper, horseradish, rosemary, saffron, thyme, truffle, and/or vinegar, and even more preferably garlic, parsley, chives and/or pepper.

According to the invention, flavoring means the addition of one or more ingredients in order to influence the taste, odorous and/or visual appearance of a product. The flavoring may be achieved for example by means of spices, seasoning or condiments.

Preferably, according to the present invention, said method further comprises a step of salting of the product.

Said step of salting preferably comprises adding dry salt (NaCl) to the preparation in steps a. and/or b.

The step of salting the product is preferably carried out using dry salt (NaCl), according to traditional salting methods that are part of the general knowledge of a person skilled in the art.

Preferably, according to the invention, the salting step is carried out by incorporating dry salt (NaCl) in an amount of from 0.5 to 2 wt. % of the product obtained in step a. or in step b.

The present invention secondly relates to a proteo-oleaginous-based fermented food product, characterized in that it is obtained by the method according to the present invention.

Preferably, according to the present invention, the proteo-oleaginous base of said fermented food product is the combination of soya and cashew alone.

Preferably, according to the present invention, said fermented food product is 75%, preferably 95%, preferably 99%, preferably 100%, of vegetable origin. In particular, said product does not contain any trace of animal product, in particular dairy product. Preferably, according to the present invention, said fermented food product does not contain lactose.

Preferably, according to the present invention, said fermented food product does not contain gluten.

Preferably, according to the present invention, said fermented food product is present in the form of gel, puree, or portions.

Said products exhibit qualitative and organoleptic characteristics (texture, natural flavor, taste) that are very close to those of traditional fermented dairy products.

At the end of the production, said food product according to the present invention is packaged and stored at a temperature of from 1° C. to 6° C. until sale, having a shelf life of from several days to several weeks.

The examples below illustrate the products obtained according to the present invention:

EXAMPLE 1

Preparation of a Batch of 6 Products of 150 g, Based on Cashew, Lupin and Soya 360 g of cashew, 15 g of dehulled soya, and 15 g of lupin are ground in 510 g water to obtain a homogeneous mixture.

Optionally, 10 g of salt is added during grinding of the mixture of cashew, soya and lupin.

A total of 4 g of the following ferments are added to this mixture, in identical proportions: *Bifidobacterium lactis, Lactobacillus acidophilus, Lactobacillus bulgaricus, Lactobacillus paracasei, Lactobacillus plantarum*, and *Streptococcus thermophilus*. This new mixture is then ground.

Said ground mixture is then poured into pots.

Said pots are incubated at 38° C. in a sterilizer, for 13 hours.

The products obtained are then placed in a refrigerator at 4° C.

EXAMPLE 2

Preparation of a Batch of 6 Products of 128 g, Based on Cashew and Soya 155 g of cashew and 95 g of dehulled soya are ground in 650 g water to obtain a homogeneous mixture.

Optionally, 20 g of salt is added during grinding of the mixture of cashew and soya.

A total of 4 g of the following ferments are added to this mixture, in identical proportions: *Lactobacillus acidophilus, Lactobacillus bulgaricus, Lactobacillus rhamnosus, Lactococcus cremoris*, and *Streptococcus thermophilus*. This new mixture is then ground or homogenized.

The obtained mixture is then incubated, in a suitable receptacle, at 40° C. in a sterilizer for 8 hours.

The mixture obtained is then drained for 20 hours at 4° C., resulting in a loss of mass of approximately 15%.

EXAMPLE 3

Preparation of a Batch of 6 Products of 150 g, Based on Cashew and Soya 250 g of cashew and 40 g of dehulled soya are ground in 610 g water to obtain a homogeneous mixture.

Optionally, 15 g of salt is added during grinding of the mixture of cashew and soya.

A total of 3 g of the following ferments are added to this mixture, in identical proportions: *Lactobacillus bulgaricus* and *Streptococcus thermophilus*.

Optionally, 1 g of the ferment *Lactobacillus plantarum* is added to this mixture.

This new mixture is then ground or homogenized.

Said ground mixture is then poured into pots.

Said pots are incubated at 42° C. in a sterilizer, for 8 hours.

The products obtained are then placed in a refrigerator at 4° C.

Optionally, 1.5% chopped garlic, 1% chopped parsley, and 0.1% pepper are added to the mixture obtained.

Said obtained mixture is then poured into pots.

The products obtained are then placed in a refrigerator at 4° C.

The invention claimed is:

1. A method for manufacturing a proteo-oleaginous-based fermented food product, said method comprising successive steps of:
   a. preparing an initial product by processing soya-based material and cashew-based material with water, wherein the processing is selected from the group consisting of: grinding and homogenization;
   b. adding at least one ferment to the initial product obtained in the step a., in amounts representing from 0.01 to 2 wt. % with respect to a total amount of the initial product obtained in the step a., to obtain a ferment-added initial product, and further processing the ferment-added initial product to obtain an intermediate product, wherein the further processing is selected from the group consisting of: grinding and homogenization; and
   c. incubating the intermediate product obtained in the step b., at a temperature of between 25 and 60° C., for a period of 3 to 15 hours to obtain an incubated product.

2. The method according to claim 1, further comprising a step of salting of the initial or intermediate product in at least one of the steps a. and b., respectively.

3. The method according to claim 1, wherein the soya-based material is soya juice, and the cashew-based material is selected from the group consisting of: whole shelled cashew nuts, shelled cashew nuts in pieces, and cashew juice.

4. The method according to claim 1, wherein said at least one ferment is selected from the group consisting of: *Bifidobacterium lactis, Brevibacterium linens, Candida valida, Corynebacterium flavescens, Hafnia alvei, Kluyveromyces lactis, Lactobacillus acidophilus, Lactobacillus bulgaricus, Lactobacillus paracasei, Lactobacillus plantarum, Lactobacillus rhamnosus, Lactococcus cremoris, Lactococcus diacetylactis, Lactococcus lactis, Leuconostoc cremoris, Candida yeast, Staphylococcus carnosus, Staphylococcus Xylosus,* and *Streptococcus thermophilus*.

5. The method according to claim 4, wherein said at least one ferment comprises *Lactobacillus bulgaricus* and *Streptococcus thermophilus*.

6. The method according to claim 4, wherein said at least one ferment comprises *Lactobacillus plantarum*.

7. The method according to claim 1, further comprising a step of draining of the incubated product obtained in the step c., for from 12 hours to 24 hours, at between 1° C. and 8° C.

8. The method according to claim 1, further comprising an additional step of flavoring using a flavoring agent selected from the group consisting of: a spice, a seasoning, and a condiment.

9. The method according to claim 1, wherein the step c. of incubating the intermediate product obtained in the step b. is made at a temperature between 37 to 50° C.

10. The method according to claim 1, wherein the step c. of incubating the intermediate product obtained in the step b. is made for a period of 5 to 11 hours.

11. The method according to claim 2, wherein the step of salting of the initial or intermediate product in at least one of the steps a. or b., respectively, comprises addition of dry salt (NaCl).

12. The method according to claim 7, wherein the step of draining of the incubated product obtained in the step c. lasts 18 hours.

13. The method according to claim 7, wherein the step of draining of the incubated product obtained in the step c. is done at 4° C.

14. The method according to claim 8, wherein the flavoring agent is selected from the group consisting of: garlic, parsley, chives, pepper, basil, capers, coriander, gherkin, cumin, turmeric, curry, shallot, tarragon, fennel, clove, ginger, olive oil, bay leaves, mustard, hazelnut, walnut, nutmeg, onion, oregano, sorrel, paprika, hot pepper, horseradish, rosemary, saffron, thyme, truffle, and vinegar.

15. The method according to claim 8, wherein the flavoring agent is selected from the group consisting of: garlic, parsley, chives, and pepper.

* * * * *